(12) United States Patent
Zahniser (10) Patent No.: US 7,689,038 B2
(45) Date of Patent: Mar. 30, 2010

(54) METHOD FOR IMPROVED IMAGE SEGMENTATION

(75) Inventor: Michael Zahniser, Wellesley, MA (US)

(73) Assignee: Cytyc Corporation, Marlborough, MA (US)

( * ) Notice: Subject to any disclaimer, the term of this patent is extended or adjusted under 35 U.S.C. 154(b) by 924 days.

(21) Appl. No.: 11/328,354

(22) Filed: Jan. 9, 2006

(65) Prior Publication Data
US 2007/0036436 A1 Feb. 15, 2007

Related U.S. Application Data

(60) Provisional application No. 60/642,110, filed on Jan. 10, 2005.

(51) Int. Cl.
G06K 9/34 (2006.01)
G06K 9/46 (2006.01)
(52) U.S. Cl. .................. 382/180; 382/190; 382/133
(58) Field of Classification Search ............ 382/173, 382/180, 190, 128, 133, 171, 172
See application file for complete search history.

(56) References Cited

U.S. PATENT DOCUMENTS

| | | | | |
|---|---|---|---|---|
| 4,484,081 A | * | 11/1984 | Cornyn et al. | 250/559.46 |
| 6,021,213 A | * | 2/2000 | Helterbrand et al. | 382/128 |
| 2003/0068074 A1 | * | 4/2003 | Hahn | 382/128 |
| 2003/0152262 A1 | * | 8/2003 | Mao et al. | 382/154 |
| 2004/0258305 A1 | * | 12/2004 | Burnham et al. | 382/171 |
| 2006/0098858 A1 | * | 5/2006 | Guittet | 382/133 |

FOREIGN PATENT DOCUMENTS

WO WO 01/11564 A1 2/2001

OTHER PUBLICATIONS

Taiwan Office Action with English translation for Taiwan Patent Application No. 95100920, dated Aug. 28, 2008, Applicant Cytyc Corporation (30 pages).

(Continued)

*Primary Examiner*—Jon Chang
(74) *Attorney, Agent, or Firm*—Vista IP Law Group LLP (57) ABSTRACT

An improved image segmentation algorithm is provided that identifies each object in an image. Pixels of the image are sorted based on a range of attribute values of the image. These pixels are then added to a labeling image one by one starting with an extreme point in the range of attribute values. Features are calculated for each object located and these features are matched with pre-defined acceptance criteria. If there is a match, the object is output to an output image. The steps of adding pixels to the image, evaluating the features of the resulting objects and outputting the objects are repeated until a stopping point is reached.

33 Claims, 7 Drawing Sheets

OTHER PUBLICATIONS

Tai An-Chi, "Study of Watershed Algorithm-Based Segmentation of Color Images", Master's Candidate Thesis Paper with English translation, Jun. 2006, Chapter III, pp. 33-36 (10 pages).

Kao Ming-Yih, "Use of 3-D Region Growing Method in Segmentation of Magnetic Resonance Cerebral Imaging", Master's Candidate Thesis Paper with English translation, Jul. 2003, p. 14 and 20 (6 pages).

Shwu-Huey Yen et al., "Segmentation on Color Images Based on Watershed Algorithm", Proceedings of the 10th International Multimedia Modelling Conference (MMM '04), 2004, pp. 227-232 (6 pages).

Carvalho, Marco A.G. et al., "Segmentation of Images of Yeast Cells by Scale-Space Analysis," Proceedings on the XVI Brazilian Symposium on Computer Graphics and Image Processing (SIBGRAPI'03), XP-010664309, IEEE Computer Society, Oct. 2003, 376-380, 5 pages.

Fisher et al., "Hierarchical Image Segmentation Using a Watershed Scale-Space Tree," University of East Anglia, UK paper, Image Processing and its Applications, XP-006501128, IEE, UK, vol. 2, Jul. 1999, pp. 522-526.

Jones, Ronald, "Connected Filtering and Segmentation Using Component Trees," XP-004444612, Computer Vision and Image Understanding, vol. 75, No. 3, Sep. 1999, pp. 215-228.

Kupinski, Matthew et al., "Automated Seeded Lesion Segmentation on Digital Mammograms, " XP-011035755, IEEE Transactions on Medical Imaging, vol. 17, No. 4, Aug. 1998, pp. 510-517.

Matas, J. et al., "Robust Wide Baseline Stereo from Maximally Stable External Regions," XP-002390323, Electronic Proceedings of the BMVC, 2002, pp. 384-393.

Meijster, Arnold et al., "A Comparison of Algorithms for Connected Set Openings and Closings," XP-001144048, IEEE Transactions on Pattern Analysis and Machine Intelligence, vol. 24, No. 4, Apr. 2002, pp. 484-494.

PCT International Search Report for PCT/US2006/000726, Applicant: Cytyc Corporation, Form PCT/ISA/210, dated Jul. 27, 2006 (5 pages).

PCT Written Opinion of the International Searching Authority for PCT/US2006/000726, Applicant Cytyc Corporation, Form PCT/ISA/237) dated Jul. 27, 2006 (7 pages).

Sonka, M. et al., "Image Processing, Analysis and Machine Vision", (Passage), XP-002390329, 1998, pp. 232-235 (p. 233).

* cited by examiner

METHOD FOR IMPROVED IMAGE SEGMENTATION

RELATED APPLICATION

This application claims priority benefit and is a non-provisional of U.S. Provisional Application No. 60/642,110 filed Jan. 10, 2005, which is incorporated herein by reference in its entirety.

Government Rights

This invention was made with U.S. Government support under NIH Grant Number RR018046 awarded by the National Institutes of Health. The U.S. Government may have certain rights in this invention.

BACKGROUND OF THE INVENTION

1. Field of Invention

The present invention relates generally to the field of image analysis. More specifically, the present invention is related to a novel image segmentation method.

2. Discussion of Prior Art

In pathology or cytology, it is often desirable to locate and measure cells or nuclei using an automated or semi-automated instrument. Such instruments may be used for research, or for screening. An example of the latter is the screening for cervical cancer using the Papanicolou test (or Pap test). These instruments acquire and analyze digital images to locate cells of interest or to classify slides as being normal or suspect.

In the analysis of objects in digital images it is essential that the objects be distinguished from the background of the image. To characterize cells or objects, the objects must first be located. The process of locating objects within the digital image is known as "segmentation." A variety of techniques are used in the segmentation process to locate the objects of interest so that subsequent computer analysis can characterize the objects. For example, segmentation of an image containing cells might allow the cell's nucleus and/or cytoplasm to be located.

A traditional approach to the task of locating and classifying objects within an image involves several stages: first— segmenting the image to create a binary mask of the objects; then—labeling the objects in this mask, with each connected set of pixels assigned a different label; and finally—measuring various features of the labeled objects.

One of the techniques used for segmenting images is "thresholding." In this technique, a threshold value of image brightness is chosen and each pixel in the image is then compared with this threshold value. Pixels with a brightness value above this threshold are considered background pixels; pixels with values below the threshold are considered object pixels. The threshold value for locating objects may be chosen based on an image histogram, which is a frequency distribution of the darkness values found within an image. A thresholding algorithm may find a single threshold value using these histograms. For instance, the threshold value might be half-way between the darkest and lightest pixels. Alternatively, the threshold value might be chosen as an inflection point between the abundant "background" pixels and the more rare "object" pixels. Finding an ideal threshold for each object in an image is a difficult task. Often a single threshold value is not optimal for multiple objects with varying darkness values within an entire image.

Once the threshold value is chosen and the thresholding process is completed, the "object" pixels can form a binary mask of the objects in the image. A boundary around the mask might be used to represent each object. The boundary might or might not reflect the object accurately. Many methods have been developed to refine the boundary once it is located. Such methods may use darkness information near the boundary, or constraints such as gradient, curvature, "closeness to a circle," etc. to refine boundaries.

Currently known techniques for image segmentation are often complex and time consuming. These techniques do not always yield high accuracy in the segmentation process, particularly if there is little contrast between the object to be located and the background surrounding it. Consequently, current segmentation algorithms often fail to locate objects properly. In cell image analysis, for example, a cell nucleus might be incorrectly segmented because the located boundary is too large or too small. This can result in false positive events (the instrument incorrectly calls a normal object suspicious) or false negative events (the instrument misses a true suspicious object).

There is a need for improved segmentation for automated imaging and automated imaging devices, in particular for the accurate identification of object boundaries.

Whatever the precise merits, features, and advantages of currently known segmentation techniques, none of them achieve or fulfill the purposes of the present invention.

SUMMARY OF THE INVENTION

The present invention provides for a method to identify each object in an image, the method comprising steps of: (a) sorting pixels based on a range of attribute values of the image; (b) adding the sorted pixels, one by one, to a "labeling image" to locate objects in the labeling image, starting with an extreme point in the range of attribute values; (c) outputting the objects onto an output image if features of the objects match a pre-defined acceptance criteria; and (d) performing steps b and c repeatedly until a stopping point is reached, the stopping point representing another extreme point in the range of attribute values.

The present invention provides for an article of manufacture comprising a computer readable medium having computer readable program code embodied therein which identifies each object in an image, the medium comprising: (a) computer readable program code sorting pixels based on a range of attribute values of the image; (b) computer readable program code adding the sorted pixels, one by one, to a labeling image to locate objects in the labeling image, starting with an extreme point in the range of attribute values; (c) computer readable program code outputting the objects onto an output image if features of the objects match a pre-defined acceptance criteria; and (d) computer readable program code performing steps b and c repeatedly until a stopping point is reached, the stopping point representing another extreme point in the range of attribute values.

The present invention provides for a method to identify each object in an image under a plurality of threshold values, the method comprising steps of: (a) sorting pixels in the image based on a range of attribute values of the pixels, wherein the range of attribute values correspond to the plurality of threshold values; (b) adding pixels, one by one, to a labeling image to create new objects or update old objects, starting with an extreme point in the range of attribute values; (c) calculating features of the created new objects and the updated old objects; (d) matching the calculated features of the created new objects and the updated old objects with a pre-defined criteria; (e) outputting the created new objects and the updated old objects on an output image if an acceptance criteria is satisfied for the features; and (f) performing step b-e repeatedly until a stopping point is reached, wherein the stopping point chosen from any of the following: another extreme point in the range of values, a point representing background pixels values in the range of attribute values or a point representing pixel values not related to the new objects and the updated old objects.

DESCRIPTION OF THE PREFERRED EMBODIMENTS

While this invention is illustrated and described in a preferred embodiment, the invention may be applied and produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

An improved automated image segmentation technique is described herein for identification of object boundaries in a digital two dimensional image. While the image segmentation technique described herein identifies nuclei, the technique itself can be applied to identifying any object in a digital image, such as cytoplasms or tissue structures in biological applications, or objects for non-biological applications such as different components on a circuit board, or man-made and natural features on a satellite image. This technique could be extended to a three dimensional image, such as those produced by X-Ray, CAT (Computed Axial Tomography) scan or MRI (Magnetic Resonance Imaging) devices. Three dimensional pixel elements in such three dimensional images are known as "voxels." Clusters of voxels might represent an organ, or a tumor in three dimensions.

Figure 1:
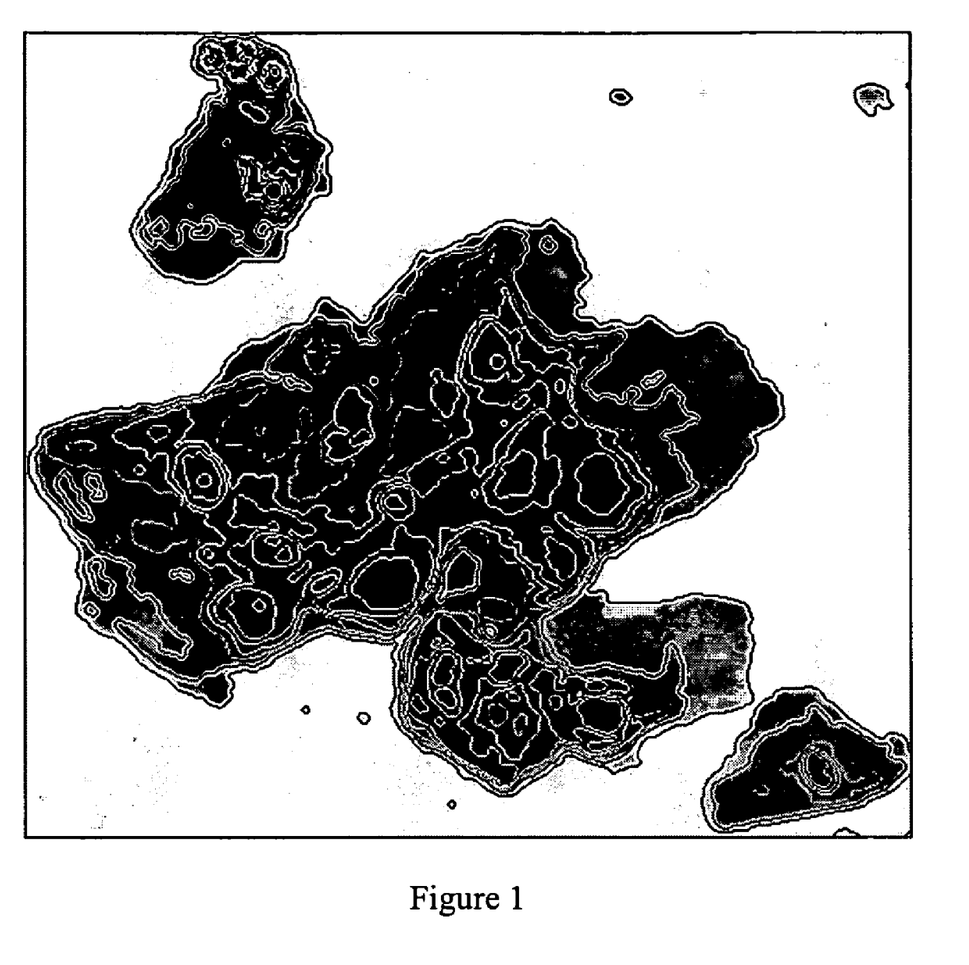
FIG. 1 illustrates a brightness "contour map" superimposed on cells in a cell group.

A digital two dimensional image may be thought of as a three-dimensional surface, where the height dimension represents the grey value (i.e. brightness) of each pixel. In a contour map of that surface, identifying the nuclei might be done by finding the contours that are within a certain size range and round enough to be nuclei. If one contour is contained within another, the "better" of the two should be chosen. FIG. 1 shows such a contour map superimposed on cells in a cell group. The objects of interest on the image are sets of connected pixels Generating these contours, which is equivalent to generating all objects under all possible threshold values, is a mathematically complex and time consuming task. A naïve approach would be simply to segment the image under each threshold, label the objects, measure their features, and keep the objects with the best features, eliminating objects which are subsets or supersets of "better" objects. This approach would be far too computationally expensive.

Figure 2:
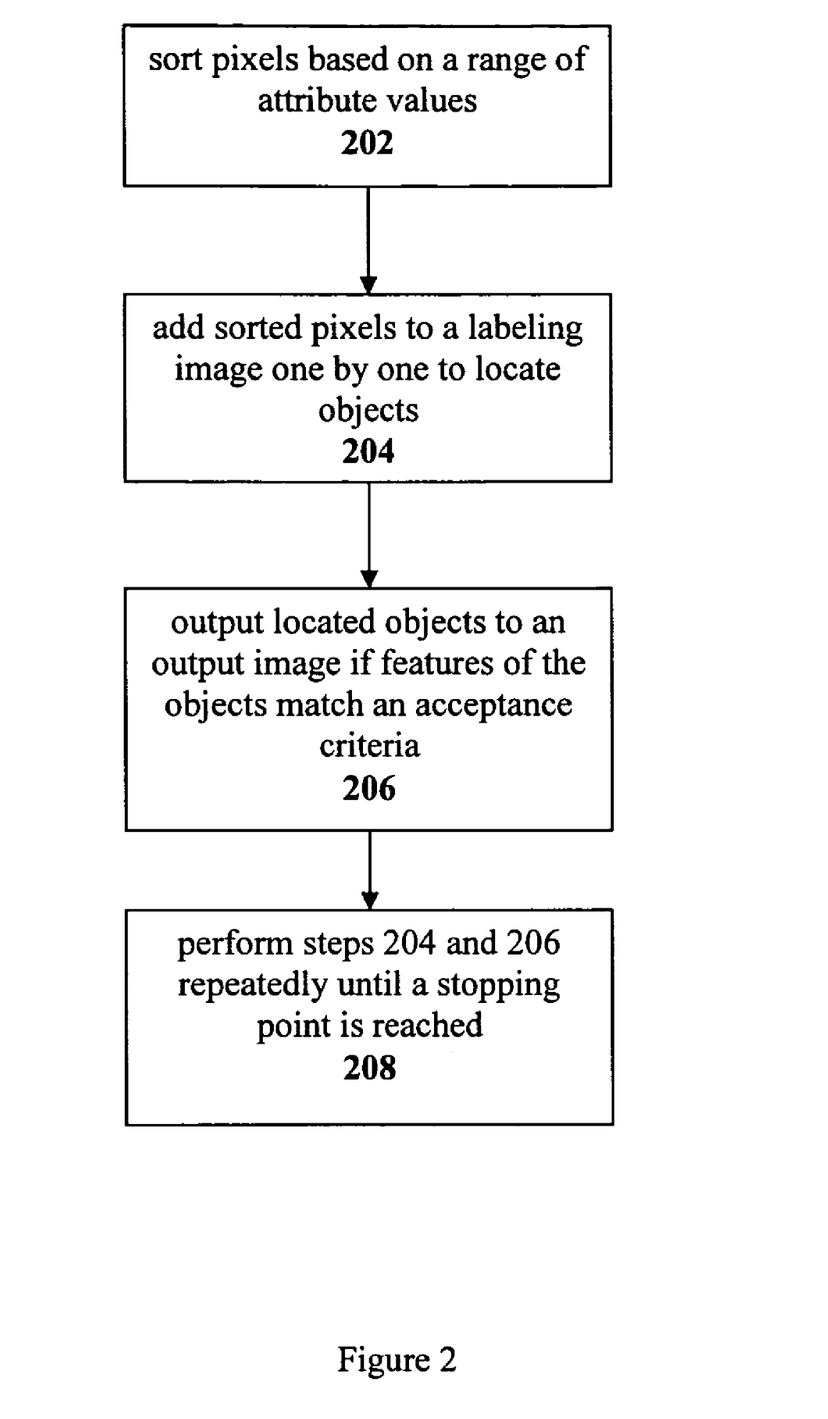
FIG. 2 illustrates steps of the image segmentation algorithm, as per one embodiment of the present invention.

FIG. 2 illustrates an image segmentation algorithm as per one embodiment of the present invention that identifies each object found in an image by performing the following steps. First the algorithm sorts pixels based on a range of attribute values of the image (step 202). It then adds the sorted pixels one by one to a "labeling image" for the purpose of locating objects in the labeling image, starting with an extreme point in the range of attribute values (step 204). A labeling image is an image wherein the pixels of each distinct object are assigned a unique value, or "label." Also, the extreme point used for the starting value may be at the lowest or the highest end of the range of attribute values. The pixels can be sorted based on attributes such as, but not limited to, brightness, hue, gradient, etc. Features of the located objects are then compared to a pre-defined criteria. If an object matches the criteria, the algorithm outputs the object to an output image, as shown in step 206. A stopping point is also defined for the image. This stopping point represents a point in the range of the attribute values at which the algorithm should stop performing steps 204 and 206 repeatedly (step 208). This stopping point may be the other extreme point in the range of attribute values. In one embodiment, this stopping point is a point representing background pixel values in the range of attribute values. In another embodiment, the stopping point is a point representing pixel values not related to the objects being located.

Figure 3A:
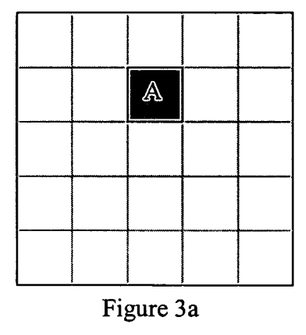
FIGS. 3a-3n collectively illustrate the processing during addition of pixels into a labeling image, as per one embodiment of the present invention.
Figure 3B:
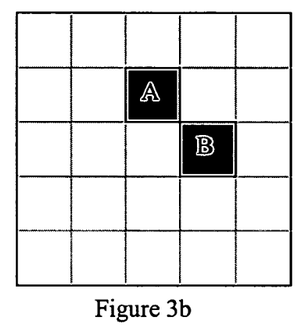
Figure 3C:
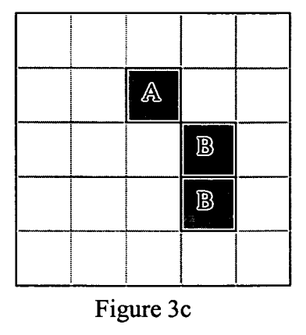
Figure 3D:
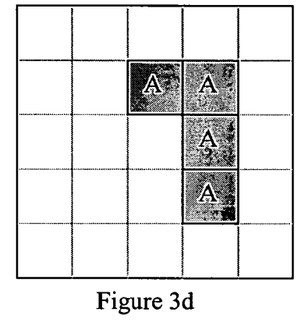
Figure 3E:
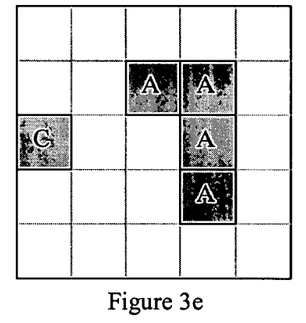
Figure 3F:
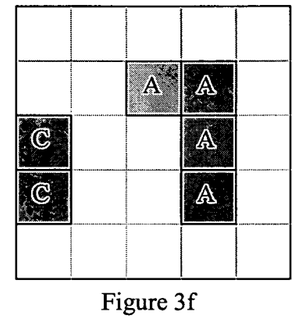
Figure 3G:
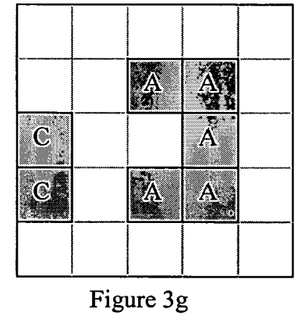
Figure 3H:
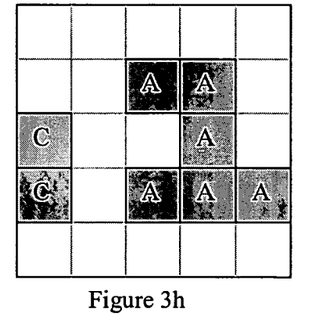
Figure 3I:
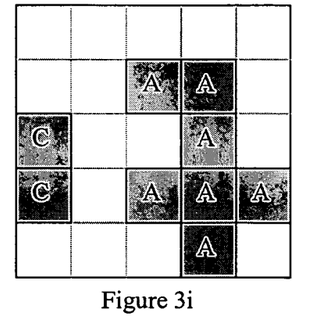
Figure 3J:
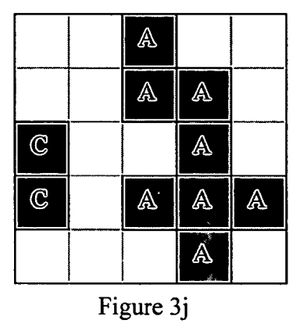
Figure 3K:
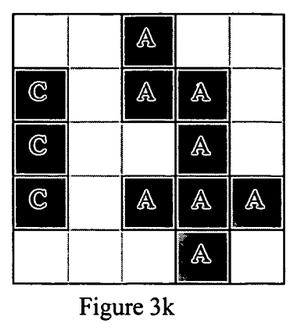
Figure 3L:
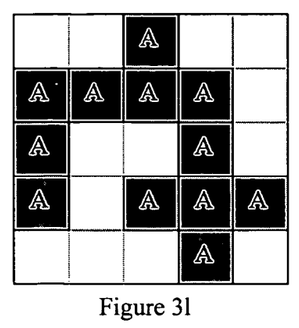
Figure 3M:
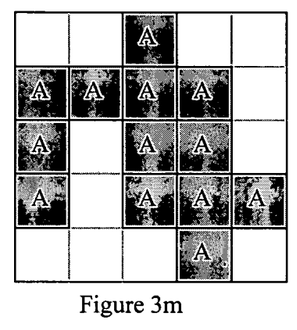
Figure 3N:
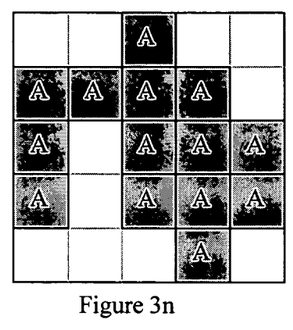
Figure 4:
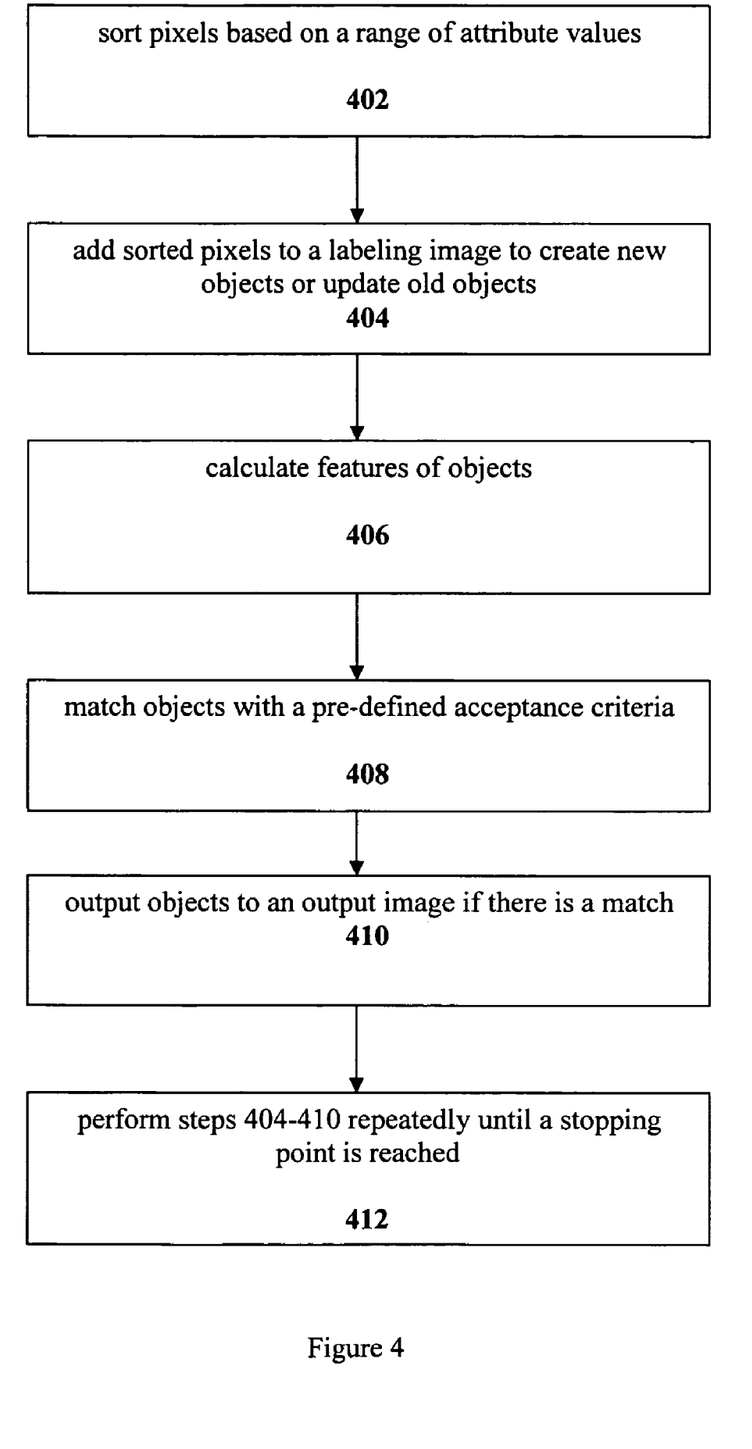
FIG. 4 illustrates steps of the image segmentation algorithm, as per a preferred embodiment of the present invention.

FIG. 4 illustrates an algorithm, as per a preferred embodiment of the present invention. In step 402, pixels in an image are sorted based on a range of attribute values of the image. The range of attribute values corresponds to a plurality of threshold values in the image. The threshold values are determined from a histogram of the attribute values being used. The pixels can be sorted based on attributes such as, but not limited to, brightness, hue, gradient, etc. Also, the indexing on a histogram could be done by brightness, hue, gradient, etc. Instead of segmenting the image at each threshold value, sorted pixels are added to a blank labeling image one by one, starting with an extreme point in the range of attribute values as shown in step 404, wherein new objects are created or old objects are updated in the process. If the pixel added is not adjacent to another pixel or object already placed on the labeling image (old object), a new object is created (see FIGS. 3a, 3b and 3e). If the added pixel is adjacent to an old object, the pixel is combined with the old object to update the old object (see FIGS. 3c, 3d, 3f, 3g, 3h, 3i, 3j, 3k, 3m and 3n). Further, if the added pixel joins two old objects, the two old objects are updated and merged into one object (see FIG. 3l). In step 406, features of these new or updated objects are calculated. These features are then matched with pre-defined acceptance criteria, in step 408. If there is a match (i.e. acceptance criteria are satisfied), the new or updated object (representing a located nucleus), is output onto the output image in step 410. The algorithm performs the steps 404-410 repeatedly until a stopping point is reached (step 412). Note that the objects may be output to the output image at any time during the processing of a threshold value (i.e., attribute value).

Again, this stopping point may be the other extreme point in the range of attribute values. In one embodiment, this stopping point is a point representing background pixel values in the range of attribute values. In another embodiment, the stopping point is a point representing pixel values not related to the objects being located.

The algorithm tracks the objects created or updated in the steps described earlier, along with their features. The objects are also assigned labels (for example, see FIGS. 3a and 3b). Whenever a pixel is added that touches an existing object, that object's label is assigned to it and the features of that object are updated to reflect the addition of the new pixel (for example, see FIGS. 3d and 3g). When a pixel is added that joins two objects, the labels and features of the two are merged into one (for example, see FIG. 3l). FIGS. 3a-3n show how pixels are added into an originally blank mask/labeling image one at a time and labels are assigned as needed to each pixel.

As a result of the way the algorithm is designed, there is a record of the mask of the image during the processing of the image at any given time under a particular threshold, as well as the labels and features of all objects found at that particular threshold. But instead of generating those data anew for each threshold value, the algorithm builds on the data from the previous threshold. This greatly increases the algorithm's efficiency.

Figure 5:
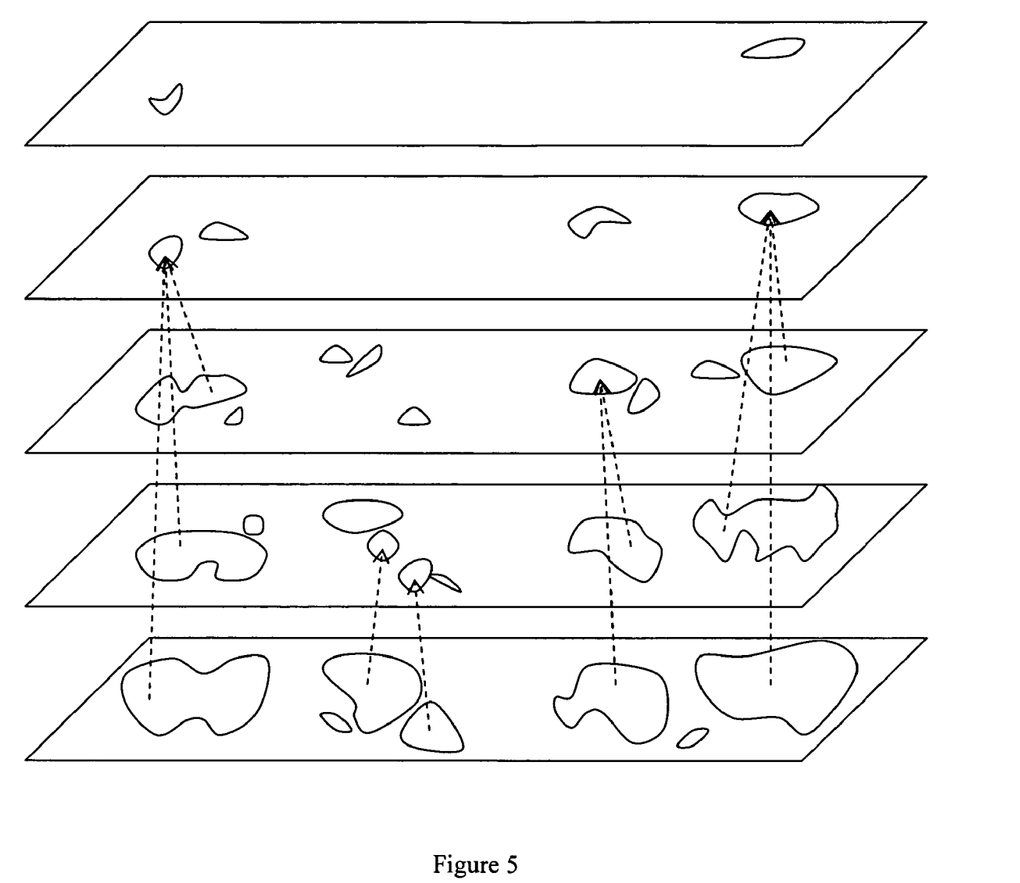
FIG. 5 depicts the growth of objects in an image at five different threshold values, as per one embodiment of the present invention.

In one embodiment of the present invention, an object is output to the output image only if its current features calculated at a current threshold are a better match to the acceptance criteria than its features calculated in all previous thresholds. In order to determine a better match, data from the previous best match is used. To compute an optimal set of objects that best matches the acceptance criteria out of all objects at all thresholds, a method called dynamic programming is used. The program passes through the thresholds one at a time, keeping track of the best set of objects that can be formed using only the objects located so far. Each object "remembers" the best state it has attained so far. FIG. 5 depicts the growth of objects in an image at five different threshold values. Individual objects that were separate at one threshold may be joined at another threshold. Each object in the figure "points to" its previous best state. Objects with no arrows point to themselves (not shown). This means that the current state of these objects is better than any of their previous states. Thus, the new state of an object only needs to be compared to the state to which its arrow points, since this state represents the best state achieved so far. If two objects merge at a given threshold, the arrow for the new, merged object points to the better of the two objects that form the merged object.

Figure 6:
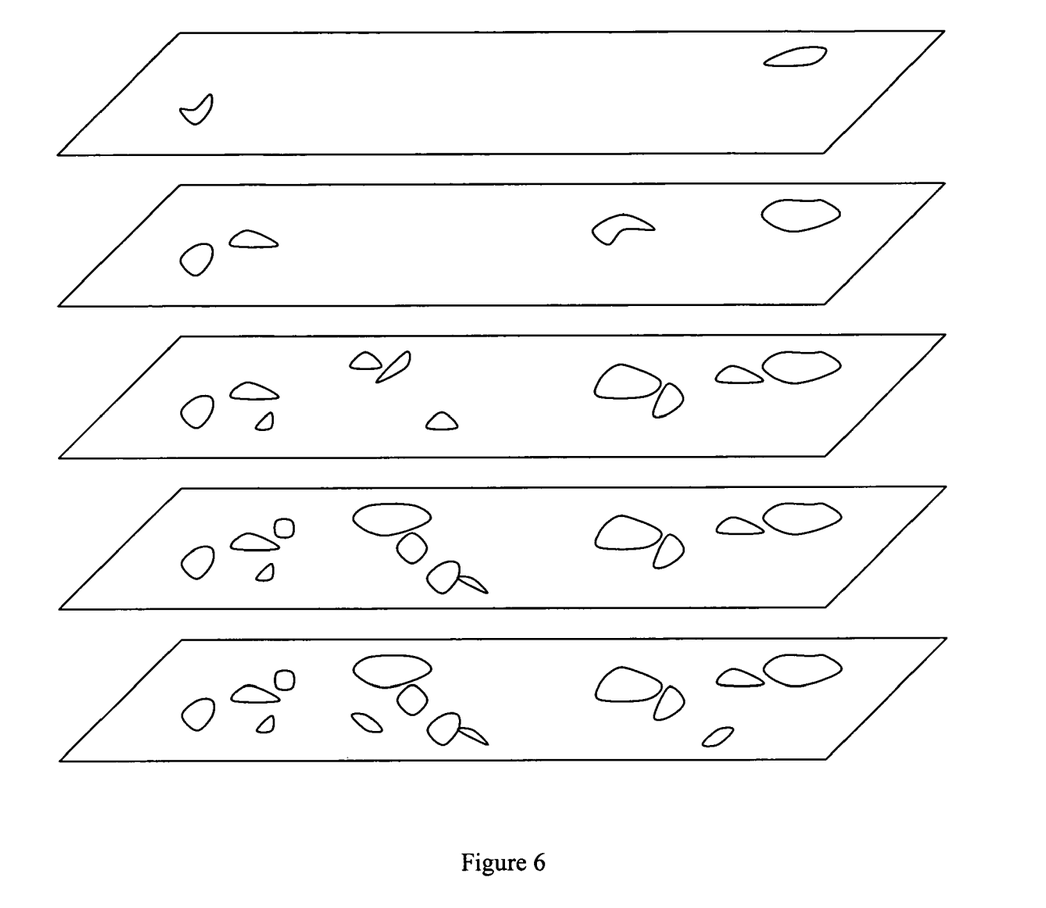
FIG. 6 illustrates the output image showing objects that were located at different threshold values where only the best state for an object is retained, as per one embodiment of the present invention.

While passing through every threshold, the program maintains an output image that contains the best objects from the set of objects formed so far. Whenever an object grows to a new state better than its previous recorded best state, the updated object is drawn into the output image. FIG. 6 shows the output image as it is growing. First it contains the objects from a first threshold. Then it contains the best objects from the first and second threshold, then the best objects from the first three thresholds, and so on. The final output image contains all of the objects that were marked as best objects and not later rejected in favor of a better one (compare to FIG. 5).

Thus, as per one embodiment of the algorithm, when an object matches the acceptance criteria, instead of being directly output to an output image, it may be conditionally output based upon a comparison between the object's current state and its previous state or states.

While the present invention's algorithm described herein, identifies cell nuclei based on features such as area and perimeter and accepts objects that fit the circularity acceptance criteria (perimeter squared divided by area), other features and criteria can be used to identify objects. Acceptance criteria can be tuned to the particular imaging application (biological or non-biological). When the objects are identified based on criteria other than circularity, other features could be used instead. Moment of inertia, eccentricity, longer and shorter elliptical axes, best fit to an ellipse, contrast with the surrounding pixels, grey value or optical density mean or standard deviation, and texture features are a few other examples of features that could be easily measured and used to specify acceptance criteria for the best segmentation. Other acceptance criteria may also be used such as size, shape, texture, color, density, contrast etc. Multiple criteria sets may allow different kinds of objects such as nuclei, nuclei of different shapes, cytoplasms, nuclear or cytoplasmic "inclusions" and clustered cells, in a single image to be located at the same time. However, it should be understood that the present invention is not limited to the use of these features or acceptance criteria.

Updating the perimeter measurement of an object when a pixel is added to it can be done using only the four pixels immediately adjacent to that pixel if a reasonable approximation of the perimeter is all that is required. Therefore, each time a pixel is "placed," only that pixel and its four nearest neighbors need be examined to determine how the object features should be updated. The only situation where more than these four neighbors are influenced is when two objects are merged and one of the two must be assigned the label of the other. However, optimizations in the merging process allow the algorithm's running time to approach a running time linear in proportion to the number of pixels. Thus, this measurement of perimeter shows how object features can be calculated from previous objects, i.e., it shows that the algorithm builds on the data from the previous threshold and increases the algorithm's efficiency.

As another example, ellipticity (comparison of the measured object to the ellipse defined by the moment of inertia matrix) may be used as a feature to identify nuclei. Segmentation based on ellipticity may better segmentation results, since it would distinguish elongated nuclei from irregularly shaped artifacts.

It can thus be seen that the algorithm of the present invention provides for various improvements: reduction in processing time for segmentation in images, elimination of time consuming pre-processing to locate potential objects of interest and then establishing regions of interest to more accurately define an object in a secondary process, handling of images with varying darkness and contrast to minimize false negative cases, handling images with abnormal clusters to minimize false negative cases, identifying multiple objects in a single image at the same time using multiple acceptance criteria.

It should be noted that the algorithm of the present invention differs from other published iterative image analysis techniques such as region growing algorithms and active contours (also called "snakes"). Region growing algorithms work by first dividing an image into many separate regions (individual pixels, small groups of pixels, contiguous pixels with the same grey level, etc.). Next, regions "grow" by merging with other regions that touch them and have similar features. This is usually an iterative process that stops once no more merges of similar regions can be made. The goal of the technique is for the final set of regions to correspond to the objects being segmented.

In the segmentation algorithm of the present invention, the way that the objects will "grow" is predetermined: there is only one path that the growth can take and the algorithm simply "watches" the features of the objects changing as they travel along that path. The features that are measured do not influence which pixel is added next or which regions are merged. After a single pass through the image, the "best objects" observed in that path are reported.

In the region growing technique, the features of the regions determine which regions are grown or merged. Instead of following a linear path, the region growing technique is like is a search through a tree with many branches. Object features are used to determine which branch to take. Usually multiple passes are made through the image, and the final state of the regions is reported. Region growing algorithms do not store the best states attained by the objects; rather, the algorithm may have to "back up" to return to a better state.

"Active contours," also called "snakes," are object outlines represented either by polygons or by parametric equations, overlaid on the image. In an active contour image analysis technique, these lines "evolve" to improve their own shape and their correspondence with the underlying image. Again, this is an iterative process ending when the outlines cannot be improved by further evolution.

The present invention operates on individual pixels and performs operations using only the immediate neighbors of each pixel. In the active contours technique, the contours are represented, not by pixels, but by mathematical functions. The differences between the present algorithm and the active contours techniques are the same as the differences noted with the region growing technique.

A key difference that distinguishes the algorithm of the present invention from other segmentation algorithms is that other algorithms involve an iterative process seeking the best path through a tree or graph, using the object features to choose which direction to move next. Sometimes this requires backtracking as the algorithm works to end up with the best possible result. The present algorithm follows a linear, predetermined path, passing by and remembering all the "best" objects on its way.

Additionally, the present invention provides for an article of manufacture comprising computer readable program code contained within implementing one or more modules to segment images and identify objects. Furthermore, the present invention includes a computer program code-based product, which is a storage medium having program code stored therein that can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for:
a) sorting pixels based on a range of attribute values of an image;
b) adding the sorted pixels, one by one, to a labeling image to locate objects in the labeling image, starting with an extreme point in the range of attribute values;
c) outputting the objects onto an output image if features of the objects match a pre-defined acceptance criteria; and
d) performing steps (b) and (c) repeatedly until a stopping point is reached, said stopping point representing another extreme point in said range of attribute values.

CONCLUSION

A system and method has been shown in the above embodiments for the effective implementation of a method for improved image segmentation. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware. Also, the present invention algorithm should not be limited by the type of image (biological, non-biological, two dimensional or three dimensional, etc.), the number of threshold values in an image, the type of objects to be identified in an image, or features and acceptance criteria used to identify objects.

The invention claimed is:

1. A method to identify each object in an image, said method comprising steps of:
   a. sorting pixels based on a range of attribute values of said image;
   b. adding one of said sorted pixels to a labeling image to locate an object in said labeling image;
   c. outputting said object onto an output image if features of said object match a pre-defined acceptance criteria; and
   d. starting with one extreme point in said range of attribute values, performing steps b and c repeatedly utilizing a computer until another extreme point in said range of attribute values is reached.

2. The method to identify each object in the image, as per claim 1, wherein said pixels are sorted based on any of the following attribute values: brightness, hue, or gradient.

3. The method to identify each object in the image, as per claim 1, wherein said object is located by adding said one of said sorted pixels to the labeling image to create a new object or an updated old object.

4. The method to identify each object in the image, as per claim 3, wherein said new object is created if said added pixel is not adjacent to another pixel or object already placed on said labeling image.

5. The method to identify each object in the image, as per claim 3, wherein said updated old object is created if said added pixel is adjacent to already existing said old object or if said added pixel joins two old objects already existing on said labeling image.

6. The method to identify each object in the image, as per claim 1, wherein said object is assigned a label, wherein labels are updated for each added pixel.

7. The method to identify each object in the image, as per claim 6, wherein said label of said object builds on labels from a previously added pixel.

8. The method to identify each object in the image, as per claim 1, wherein said features of said object are calculated from features of an object located when a pixel was previously added.

9. The method to identify each object in the image, as per claim 1, wherein said object is output to said output image only if said object's features calculated when said sorted pixel is added are a better match to said acceptance criteria than said object's features calculated for all previously added pixels.

10. The method to identify each object in the image, as per claim 1, wherein said method is performed on two-dimensional or three-dimensional images from biological or non-biological applications.

11. The method to identify each object in the image, as per claim 10, wherein said object in said biological applications is any of the following: a cell, a nucleus, cytoplasm, a nuclear or cytoplasmic inclusion, clustered cells, or an object within images produced by imaging devices.

12. The method to identify each object in the image, as per claim 10, wherein said object in said non-biological applications is any of the following: a component on a circuit board, or a man-made or natural object in a satellite image.

13. The method to identify each object in the image, as per claim 1, wherein said features are any of the following: perimeter, area, object moment of inertia, eccentricity, elliptical axes, best fit to an ellipse, contrast, grey value, optical density mean, standard deviation, or texture.

14. The method to identify each object in the image, as per claim 1, wherein said acceptance criteria are any of the following: size, shape, texture, color, or density.

15. The method to identify each object in the image, as per claim 1, wherein said method uses multiple acceptance criteria to identify different kinds of objects in said labeling image simultaneously.

16. The method to identify each object in the image, as per claim 1, wherein steps b and c are performed repeatedly until a point representing background pixels values in said range of attribute values, or a point in said range of attribute values representing pixel values not related to said objects being located, is reached.

17. A computer readable medium having computer readable program code embodied therein for execution by a processor to perform a method comprising:
   a. sorting pixels based on a range of attribute values of said image;
   b. adding one of said sorted pixels to a labeling image to locate an object in said labeling image;
   c. outputting said object onto an output image if features of said object match a pre-defined acceptance criteria; and
   d. starting with one extreme point in said range of attribute values, performing steps b and c repeatedly until another extreme point in said range of attribute values is reached.

18. The computer readable medium having computer readable program code embodied therein for execution by the processor to perform the method, as per claim 17, wherein steps b and c are performed repeatedly until a point representing background pixels values in said range of attribute values, or a point in said range of attribute values representing pixel values not related to said objects being located, is reached.

19. A method to identify each object in an image under a plurality of threshold values, said method comprising steps of:
   a. sorting pixels in said image based on a range of attribute values of said pixels, wherein said range of attribute values correspond to said plurality of threshold values;
   b. adding one of said pixels to a labeling image to create a new object or update an old object;
   c. calculating features of said created new object or said updated old object;
   d. matching said calculated features of said created new object or said updated old object with a pre-defined criteria;
   e. outputting said created new object or said updated old object on an output image if an acceptance criteria is satisfied for said features; and
   f. staffing with one extreme point in said range of attribute values, performing steps b through e repeatedly utilizing a computer until a stopping point is reached, said stopping point being selected from the group consisting of: another extreme point in said range of values, a point representing background pixels values in said range of attribute values, and a point in said range of attribute values representing pixel values not related to said new object or said updated old object.

20. The method to identify each object in the image under the plurality of threshold values, as per claim 19, wherein said pixels are sorted based on any of the following attribute values: brightness, hue, or gradient.

21. The method to identify each object in the image under the plurality of threshold values, as per claim 19, wherein said plurality of threshold values is brightness, hue, or gradient.

22. The method to identify each object in the image under the plurality of threshold values, as per claim 19, wherein said new object is created if said added pixel is not adjacent to another pixel or object already placed on said labeling image.

23. The method to identify each object in the image under the plurality of threshold values, as per claim 19, wherein said updated old object is created if said added pixel is adjacent to already existing said old object or if said added pixel joins two old objects already existing on said labeling image.

24. The method to identify each object in the image under the plurality of threshold values, as per claim 19, wherein said method is performed on two-dimensional or three-dimensional images from biological or non-biological applications.

25. The method to identify each object in the image under the plurality of threshold values, as per claim 24, wherein said object in said biological applications is any of the following: a cell, a nucleus, cytoplasm, a nuclear or cytoplasmic inclusion, clustered cells or an object within images produced by imaging devices.

26. The method to identify each object in the image under the plurality of threshold values, as per claim 24, wherein said object in said non-biological applications is any of the following: a component on a circuit board, or a man-made or natural object in a satellite image.

27. The method to identify each object in the image under the plurality of threshold values, as per claim 19, wherein said features are any of the following:
   perimeter, area, object moment of inertia, eccentricity, elliptical axes, best fit to an ellipse, contrast, grey value, optical density mean, standard deviation, or texture.

28. The method to identify each object in the image under the plurality of threshold values, as per claim 19, wherein said acceptance criteria are any of the following: size, shape, texture, color, or density.

29. The method to identify each object in the image under the plurality of threshold values, as per claim 19, wherein said method uses multiple acceptance criteria to identify different kinds of objects in said labeling image simultaneously.

30. The method to identify each object in the image under the plurality of threshold values, as per claim 19, wherein said created new object or said updated old object is assigned a label, wherein labels are updated for each added pixel.

31. The method to identify each object in the image under the plurality of threshold values, as per claim 30, wherein said labels build on labels from a previously added pixel.

32. The method to identify each object in the image under the plurality of threshold values, as per claim 19, wherein said features of said created new object or said updated old object are calculated from features of an object located when a pixel was previously added.

33. The method to identify each object in the image under the plurality of threshold values, as per claim 19, wherein said updated old object is output to said output image only if features of said updated old object calculated when said sorted pixel is added are a better match to said acceptance criteria than features of said updated old object calculated for all previously added pixels.

* * * * *